United States Patent [19]

Graesser et al.

[11] 4,369,069

[45] Jan. 18, 1983

[54] GELATIN, METHOD FOR PRODUCING IT AND ITS USE

[75] Inventors: Wolfgang Graesser, Waldbrunn; Peter J. Koepff, Heidelberg, both of Fed. Rep. of Germany; Ivan Tomka, Bourguillon, Switzerland

[73] Assignee: Deutsche Galatine-Fabriken Stoess & Co. GmbH, Eberbach, Fed. Rep. of Germany

[21] Appl. No.: 186,253

[22] Filed: Sep. 11, 1980

[30] Foreign Application Priority Data

Sep. 12, 1979 [DE] Fed. Rep. of Germany ....... 2936835

[51] Int. Cl.³ .................................................. C09D 3/04
[52] U.S. Cl. .................................... 106/125; 260/117; 260/118
[58] Field of Search ................ 106/125, 135; 260/117, 260/118

[56] References Cited

U.S. PATENT DOCUMENTS 3,075,961 1/1963 Veis et al. ............................ 260/117

OTHER PUBLICATIONS

The Macromolecular Chemistry of Gelatin, Academic Press, N.Y., pp. 159,160, 1964, Veis.
S. Gross & P. I. Rose, *Nongelling Components from Gelatin Gels: Extraction and Identification*, The Journal of Photographic Sci., vol. 23 (33–43)1975.

*Primary Examiner*—Theodore Morris
*Attorney, Agent, or Firm*—Spencer & Kaye

[57] ABSTRACT

A gelatin containing microgel, alpha-gelatin, oligomers of alpha-gelatin, and less than 25% by weight of the gelatin, of fragments of alpha-gelatin having a molecular weight of no more than $9 \times 10^4$.

23 Claims, No Drawings

GELATIN, METHOD FOR PRODUCING IT AND ITS USE

BACKGROUND OF THE INVENTION

The present invention relates to a gelatin containing microgel, oligomers of alpha-gelatin, alpha-gelatin and fractions of alpha-gelatin (peptides), a method for producing such gelatins as well as the use of gelatins according to the invention, particularly as a binder for layers of photographic materials.

Gelatin is known to be a purified protein obtained by partial hydrolysis of the scleroprotein collagen. Due to the different types of raw materials used in the production of gelatin, namely skin material from beef cattle and calves, bacon rind and ossein (demineralized, usually comminuted bone) and due to the differences in the manufacturing processes, the resulting gelatin varies considerably in its chemical and physical properties.

Usually, the raw material is subjected to alkali decomposition, for example by means of milk of lime or soda lye, (the so-called "liming") and then melted out in an essentially neutral solution. Besides the alkali decomposition method, there is also the so-called "acid decomposition method" in which there is no alkali pretreatment and the melting out takes place in an acid medium. The respectively developed gelatin solutions are filtered, concentrated and dried. Gelatin manufacturing methods are discussed in detail in G. Reich, *Kollagen*, 1966, pages 242 et seq. published by Verlag Theodor Steinkopff, Dresden and in A. G. Ward and A. Courts, *Science and Technology of Gelatin*, 1977, Academic Press.

The properties of the gelatin thus obtained depend to a great extent on the raw material employed, on the decomposition process selected and especially on the reaction conditions during decomposition, extraction and drying. The methods for producing gelatin and the realization of certain desired properties are based to a large extent on empiric experience. Although it is possible to obtain a considerable degree of reproduceability in this way, it has been found that gelatins intended for the manufacture of photographic products must be tested in practical experiments, in order to enable the manufacture of photographic materials having the required uniformity.

The main component of the raw materials is the so-called tropocollagen, a well defined protein molecule consisting of two identical alpha$_1$ chains and one alpha$_2$ chain which is somewhat different. These chains are linked together in the vicinity of their N-terminal amino acid. The amino acid sequence of the alpha$_1$ chain is well known for the case of calfskin collagen; the polypeptide consists of a linear chain of 1052 amino acids. In this connection, see P. I. Rose & S. Gross, *Photographic Gelatin*, (published by R. J. Cox), page 89, Academic Press, 1976.

Gelatin consists of a mixture of various fractions of tropocollagen produced during the acid or alkali decomposition. The following four fractions are distinguishable as major components of gelatin and are present in different quantity ratios depending on the origin of the gelatin:

1. alpha-gelatin, consisting of complete alpha polypeptide chains; molecular weight of $9.5 \times 10^4$;
2. oligomers of the alpha chain, consisting of 2 to 15 linked alpha chains; molecular weight of $10^5$–$10^6$;
3. "microgel", consisting of polymers of up to 1000 linked alpha chains; molecular weight $10^7$–$10^8$;
4. "peptides"; different sized cleavage products of the alpha chain; molecular weight $10^4$ to $9 \times 10^4$.

A typical composition of conventional types of gelatin obtained by alkali pretreatment of the raw material and subsequent extraction with water at about 45° to 60° C., is listed in Table 1 below.

TABLE 1

| Component | molecular weight | content (weight %) |
| --- | --- | --- |
| migrogel | $10^7$ – $10^8$ | 0–15 |
| oligomers of alpha gelatin | $10^5$ – $10^6$ | 10–30 |
| alpha gelatin | $9.5 \times 10^4$ | 10–40 |
| fragment of alpha gelatin chain (peptides) | $10^4$ – $9 \times 10^4$ | 30–80 |

In this connection, see A. Veis, *The Macromolecular Chemistry of Gelatin*, Academic Press 1978, and I. Tomka, Chimia 30, pages 534 et seq. (1976, No. 12). The separation of the gelatin into various fractions has been described in detail by I. Tomka et al in J. Phot. Sci., 23, 97 (1975).

SUMMARY OF THE INVENTION

It has now been found that the four major fractions of gelatin determine its physical properties and usability in very different ways.

The most valuable components are the alpha gelatin fraction and its oligomers up to a size of about 10–15 alpha units. Due to the special configuration of the amino acid sequence, they are substantially determinative for the setting properties of the gelatin solutions. Because of upward limitations of their molecular weights, solutions of these fractions have low to medium viscosity as is often desirable for the manufacture of photographic coatings.

Experience has shown that, due to its small proportion, the fraction called "microgel" which has the highest molecular weight does not contribute much to the lattice structure of the gelled gelatin and is unable, in particular, to significantly influence the setting speed. However, because of its sometimes extremely high molecular weight, this fraction is determinative to a great extent of the viscosity of the aqueous gelatin solutions. A high proportion of microgel is therefore desirable in those cases where high viscosity is preferred for reasons of pouring; in such cases no viscosity increasing additives need be used. If in other cases low viscosity is desired, a gelatin having a low microgel content will be preferable.

The peptide fraction, the cleavage products of the alpha-gelatin, is the least valuable component of gelatin, with respect to physical properties. It has been found that the peptides do not take part in the formation of the lattice but remain substantially in the sol form. They thus weaken the lattice structure and retard gel formation. Slowly setting gelatins therefore contain a large proportion of peptides.

A further factor has been found that can interfere with gel formation. Native collagen contains amino acids exclusively in the L-configuration, but with increasing decomposition times, there may gradually occur racemization causing part of the L-amino acids to be rearranged to the D-configuration. With greater proportions of D-amino acids in the chains, the build-up of a contiguous network may be interfered with for steric reasons, and this considerably lengthens the setting time of the solutions. It is therefore desirable to obtain gelatins having as low a content of D-amino acid radicals as possible.

In many uses of gelatin in the food, pharmaceutical and photographic industries, it is extremely desirable to utilize quick setting gelatins because these are particularly easy to handle, for example, and provide reproduceable products of uniform quality. The setting times of known gelatins (measured at 16° C. and with 2.5 g gelatin in 1 dl water) lie far above one minute which brings about considerable difficulties in many cases.

It is an object of the present invention to provide a gelatin having a setting time less than that of prior art types of gelatins.

It is a further object of the present invention to provide a gelatin having a setting time of less than one minute.

To achieve these objects and in accordance with its purpose, the present invention provides a gelatin including microgel, alpha-gelatin, oligomers of alpha-gelatin, and less than 25% by weight of the gelatin, of fragments of alpha-gelatin having a molecular weight of no more than $9 \times 10^4$.

The present invention further relates to methods for producing such gelatins and to their use as binders in food products or pharmaceutical preparations and preferably in coatings of photographic materials as well as to the use of such coatings of photographic materials produced by the use of the gelatins of the present invention.

It is to be understood that both the foregoing general description and the following detailed description are exemplary, but are not restrictive of the invention.

DETAILED DESCRIPTION OF THE INVENTION

The present invention relates to gelatins having an alpha-gelatin fragment or peptide content of less than 25%, preferably less than 20%, and most preferably less than 10% by weight of the gelatin. These fragments or peptides have a molecular weight of no more than $9 \times 10^4$.

The preferred gelatin compositions contain, by weight, 5 to 15% microgel, 30 to 70% oligomers of alpha-gelatin (n=2-15), 20 to 60% alpha-gelatin and less than 25% peptides.

At the same time, in the gelatin fractions, the content of amino acid radicals having a D-configuration is preferably no more than 5 weight percent.

The molecular weight of the components of the microgel lies approximately between $10^7$ and $10^8$, and the oligomers of alpha-gelatin have molecular weights in the region between about $10^5$ to $10^6$, while the molecular weight of the alpha-gelatin is about $9.5 \times 10^4$ and the fragments of alpha-gelatin (peptides) have a molecular weight of about $10^4$ to $9 \times 10^4$.

A gelatin according to the present invention is distinguished by the fact that it has a high viscosity, i.e. more than 180 mP (millipoise) in a 10 percent gelatin solution (10 g gelatin in 100 ml water) at 60° C. The preferred viscosity range lies between 200 and 350 mP, most preferably between 200 and 300 mP, but the viscosity can also exceed such values. For 6.67% gelatin solutions and at 40° C., the viscosity is about 8 to 20 cP (80 to 200 mP).

It is also possible to achieve particularly short setting times by mixing suitable gelatin fractions which are each distinguished by low peptide content or high viscosity, respectively. In corresponding tests, setting times, for example, of 2 to 20 seconds were obtained at 16° C., with 2.5 g gelatin in 1 dl water.

A preferred method for producing a gelatin of composition according to the invention is to melt (extract) the gelatin out of a conventionally alkali pretreated raw material in a temperature range (brew temperature) between 70° and 100° C. for a time (brewing time) from 5 to 120 minutes at a pH (brew pH) between 5.5 and 7.0.

In the manufacture of gelatin according to the present invention it is preferred to start with a conventionally alkali pretreated (e.g. with aqueous calcium hydroxide solution or sodium hydroxide solution) raw material, although, in principle, it is also possible to operate in an acid medium. To obtain the desired short setting times it is significant to perform, not the gentle long time extraction (with longer period of dwell of the extraction water or of the steadily enriched gelatin solution at low temperature) of the prior art, but a high temperature short term reaction. This is understood to mean that the gelatin is extracted or melted out (brewed), in an aqueous medium, in a temperature range (brew temperature) between about 70° and 100° C. for a time (brewing time) of about 5 to 120 minutes. The pH (brew pH) will lie between about 5.5 and 7.0. A weakly alkali brew pH up to about 8.5 may also be suitable.

A particularly advantageous range for the brew temperature lies between about 70° and 82° C., and a particularly preferred brewing time lies between about 20 to 40 minutes.

The aqueous gelatin solutions obtained in this way are cooled within 1 to 60 minutes, preferably within 1 to 5 minutes, to temperatures below 55° C. It is also important to obtain a quick transition to the gel phase. This transition is obtained in the manufacturing processes according to the present invention within 5 to 45 minutes, preferably within 5 to 15 minutes.

While the extraction takes place in the prior art methods for more than 2 hours and at relatively low temperatures below 70° C., it is necessary for the gelatin according to the present invention to be extracted very quickly at higher temperatures while assuring good heat transfer conditions. With the use of the electrophoresis method which permits a determination of the composition of the gelatin being produced, the process according to the invention can be regulated in such a way that gelatins having high viscosity and simultaneously low peptide contents are obtained at defined times in defined draft sequences. ("Draft" means "Extraction").

A further method for producing the gelatins according to the invention involves the fractionation of commercially available gelatins with composition being monitored by means of gel chromotography.

The gelatins according to the invention not only have particularly favorable setting times, they are particularly well suited, due to their high viscosity, for use in certain modern casting techniques, e.g., curtain casting, because no viscosity increasing substances such as sodium cellulose sulfate, need be added, to produce coatings such as photographic coatings. In some cases, such additives adversely influence other properties of the gelatin, possibly causing discoloration.

A further decisive advantage of the gelatin according to the invention is that in industrial production, the gelatin drying process can be shortened. For example, while maintaining the conventional drying line, the temperatures of the drying air can be raised since the melting point of the gelatin according to the invention lies about 1° to 3° C. higher than that of conventional types of gelatin. In other industrial processes the blowing in of cooling air can be omitted or reduced.

Photographic materials generally consist of a planar substrate onto which is applied at least one, usually several thin coatings. At least one of these coatings is photosensitive and, in the case of conventional photographic material, consists of a fine dispersion of silver halide in a hydrophilic colloidal binder. The photosensitive layer and possible further nonphotosensitive layers may additionally contain a number of other substances, such as dyes, color couplers, sensitizers, stabilizers, solvents, wetting agents, hardeners, and additional nonhydrophilic binders in dispersed form.

Since the invention of the dry plate, gelatin has been the preferred hydrophilic binder for photographic coatings and, despite the advances in the manufacture of polymeric substances, is practically irreplaceable today. The reason for its usefulness is the unique properties of gelatin which are combined in such a favorable way in no other natural or synthetic material. The chemical properties of gelatin and its natural accompanying substances permit the production of silver halide layers having particularly high sensitivity to light. Physically, gelatins have the swellability and permeability properties necessary for aqueous processing solutions. Gelatins also have favorable properties as protective colloids which permit the production and stabilization of finely dispersed emulsions and dispersions, particularly of silver halides. Finally, the physical properties of the gelatin solutions enhance the application and drying of the gelatin in thin, uniform layers.

It is inherent in the technology of the manufacture of photographic materials that gelatins with widely varying properties must be available. This applies mainly to their chemical properties which determine to a great extent the sensitometry of the photosensitive layers. The gelatin manufacturing industry has been able to meet the changing requirements of the photographic art over an increasingly broader range of needs, and especially to meet the demands for reproduceability of the material.

When manufacturing photographic materials, particularly for the precise and economical production of thin photographic layers, next to its chemical properties the physical properties of the gelatin employed play a decisive roll. Two of these physical properties are of special significance: the viscosity of the aqueous gelatin solutions and their setting speed.

Aqueous gelatin solutions are known to be liquid only at higher temperatures. Below about 30° C. they harden to an elastic gel within a shorter or longer period of time. The only exceptions are very highly dilute solutions having a concentration of less than about 1% which remain liquid at all temperatures. The capability of gelatins to solidify to a nonflowing gel is an important feature which greatly facilitates the production and drying of precise, thin layers or even makes it possible at all.

The application of the photographic layers onto the substrate takes place with these layers in the liquid state, often a plurality of liquid layers being applied simultaneously. The layers must then be dried, which is accomplished in the fastest and most appropriate manner by blowing on warm air. Since it is impossible to roll up a material containing undried layers, the application and drying of the layers must take place continuously in one passage. For the drying process it is important that the layers which have been applied with great precision are not deformed by gravity or the moving warm air. This requirement can be met in a particularly easy manner with gelatin-containing layers by having the layers set to a gel as quickly as possible before the start of the drying process. To accomplish this, the coated substrates are conducted through a cooling line. The faster the layers set, the less are the industrial expenditures for the cooling line and the higher the advancing speed that can be utilized. A general description of the coating and drying techniques for photographic materials can be found in B. M. Deryagin et al, *Film Coating Theory*, Focal Press, 1964.

The setting speed of gelatin solutions is generally dependent on their concentration and temperature, and can be improved by increasing the gelatin concentration in the coating solution. However, such a mode of operation has certain limits set by the coating technique and such limits cannot be exceeded. With respect to colloidal chemistry, casting solutions which are too concentrated are often unstable and may tend, for example, to demix, or individual components of the solutions may flake out.

These drawbacks in the production of coatings of photographic materials can be substantially overcome with the gelatins according to the present invention. The present invention thus also relates to the use of the gelatins according to the present invention as binders for producing coatings of photographic materials and to a method for producing photographic materials comprising a substrate and at least one photographic coating, wherein the binder for at least one layer is a gelatin according to the present invention. The invention further relates to photographic materials produced in this way. These materials and coatings of the material are distinguished by good mechanical properties. The good compatibility of the gelatin according to the invention with photographic additives (e.g., dyes and dye couplers) as well as the optimum behavior of the gelatin during photographic processing (after exposure of the photographic material) have an extremely advantageous effect on image reproduction.

The gelatins according to the invention are of particular advantage not only in the photographic industry but also in the pharmaceutical and foodstuffs industries. In the pharmaceutical industry, medicinal preparations are often packed in hard gelatin capsules which are produced by an immersion process in which particularly uniform capsules can be obtained in a reproduceable manner if the setting time of the gelatin employed is very short. This manufacture of hard capsules by the immersion process is a further important field of application for the quick setting gelatin according to the invention, the flow properties of this gelatin being utilized in an advantageous manner due to its high viscosity.

The corresponding principles apply for food gelatins where short setting times may also be extremely desirable. In the candy industry, for example, in the production of marshmallows, bands of foam must solidify in about 30 seconds to the extent that they can be cut. During this time the band of foam travels on cooling bands which have a length of 20 to 30 meters. Shortening of the setting times here results in earlier opportunities for cutting and considerable savings in the size of the plant. In the manufacture of gum candy as well, shortening of the setting times results in acceleration of the manufacturing process and savings, for example, in powder boxes and storage space. Likewise, in the fish and meat product industry, reduction of the setting time of gelatin would result in increased output and reduction of plant size since, for example, shorter cooling tunnels could be used. In household applications, gelatin having a shorter setting time is also advantageous since, for example, it will no longer be necessary, when making gelatin deserts or aspics to place the bowls filled with the gelatin solution in the refrigerator for several hours.

Additionally, the slow setting of commercially available gelatin in the past constituted an insurmountable obstacle to the use of gelatin in cake icings. The slow setting caused the still liquid gelatin solution to penetrate into the cake itself and make it soggy. Only quick setting gelling agents such as pectin, agar-agar, carrageenan and alginate have therefore been used for cake icings. Shortening the setting time opens this field for gelatin as well and the replacement of the abovementioned gelling agents by gelatin is of particular advantage because those gelling agents which are often used both in the cake baking industry and in other branches of the foodstuffs industry because of their short setting times have drawbacks regarding taste and texture.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Bone granules from freshly slaughtered raw bones are carefully degreased by way of water degreasing and are macerated in the conventional manner under gentle conditions. Thereafter, liming and neutralizing takes place in the customary alkali manner.

A first draft is made at a brew pH of 6.5 and a temperature of 72° C. after 35 minutes and a second draft is made at the same pH at 78° C. after a further 20 minutes. Then the third draft is extracted at a brew pH of 6.5 and 80° C. after 25 minutes in a conventional stirring vessel, to correspond to 50 to 65% of the total yield. A partially continuous extraction process produces the same results. The resulting gelatin solution is cooled to 50° C. within 3 to 5 minutes and is converted to the gel phase within about 10 minutes. The gelatin obtained in the third draft has the characteristics listed in Table 2 under Sample No. 4.

The second draft to the fourth draft (brew pH 6.7, at 84° C. for 20 minutes), generally the middle drafts, corresponding to about 45 to 75% of the total yield may still produce usable, highly viscous gelatins according to the invention with a low peptide content.

EXAMPLE 2

Healthy beef split is cut as usual, washed and limed under conventional conditions with aqueous calcium hydroxide or sodium hydroxide solution. Then the brewing procedure continues as explained in Example 1. In the first drafts, which correspond to 0 to 20% of the total yield, the brew pH is 7.0, brewing temperature is 90° C. and brewing time is 15 minutes. As in Example 1, the resulting gelatin solutions are cooled to 50° C. within 3 to 5 minutes and are converted to the gel phase within about 10 minutes. Highly viscous gelatins which are low in peptides are obtained. The data for a gelatin obtained in this way are listed in Table 2 under Sample No. 2.

EXAMPLE 3

Fresh or frozen bacon rinds are washed and acidified in the customary manner. Then the procedure continues under conditions similar to those in Example 1, with the brew pH being at 5.0, brewing temperature at 72° C., and the brewing time 15 minutes. The characteristic data for the resulting gelatin are listed in Table 2 under Sample No. 5.

TABLE 3

| Gelatin Sample No. | 1 | 2 | 3 | 4 | 5 |
|---|---|---|---|---|---|
| Proportion of alpha-gelatin fragments (wt %) | 4 | 13 | 7 | 7 | 21 |
| Limiting viscosity (dl g$^{-1}$) at 45° C. $A_2 = 0$ | 0.85 | 0.95 | 0.8 | 1.0 | 0.85 |
| Gel strength (dyn. cm$^{-2}$) at 16° C., 2.5 g gelatin in 1 dl | $9 \times 10^4$ | $9 \times 10^4$ | $9 \times 10^4$ | $9 \times 10^4$ | $9 \times 10^4$ |
| Setting time (sec) at 16° C., 2.5 g gelatin in 1 dl | 48 | 42 | 54 | 27 | 49 |

For an explanation of the values given for limiting viscosity, gel strength and setting time, see N. Veis, *The Macromolecular Chemistry of Gelatin*, 1964, Academic Press and J. Brandrup, E. M. Immergut, *Polymer Handbook*, 1978, Interscience.

EXAMPLE 4

Table 3 below illustrates the significance of the gelatin composition of the gelatins according to the invention and their content of the various fractions, particularly peptide and microgel. The gelatin samples marked Nos. 6 through 10 were produced by fractionation of commercially available gelatins.

The composition of the gelatins was determined by preparative gel chromatography.

TABLE 3

| Sample No. | 6 | 7 | 8 | 9 | 10 |
|---|---|---|---|---|---|
| Peptides (alpha cleavage fragments) % | 18 | 10 | 14 | 1 | 1 |
| Microgel (high polymers) % | 8 | 2 | 10 | 3 | 80 |
| Setting time (2.5% solution, 16° C.) sec. | 70 | 50 | 50 | 8 | 2 |
| Gel strength (2.5% solution, 16° C.) dyn. cm$^{-2}$ | $10^5$ | $9 \times 10^4$ | $10^5$ | $10^5$ | $10^5$ |
| Viscosity (6.67% solution 40° C.) cP | 13 | 8 | 14 | 9 | 40 |

Table 3 shows a direct connection between the setting time and the peptide content of the gelatin. However, gel strength as well as viscosity of the gelatin solutions are substantially independent of the peptide content within the range covered by Table 3.

It is clear however, that a good correlation exists between microgel content and viscosity of the solutions.

Table 4 shows, for comparison, the corresponding values of five different commercially available gelatins.

TABLE 4

| Sample No. | 11 | 12 | 13 | 14 | 15 |
|---|---|---|---|---|---|
| Raw material | bone | skin | bone | bone | skin |
| Decomposition process | HCl | HCl | Ca(OH)$_2$ | Ca(OH)$_2$ | NaOH |
| Peptides (alpha cleavage fragments) % | 60 | 30 | 30 | 40 | 30 |
| Microgel (high polymers) % | 3 | 2 | 2 | 15 | 3 |
| Setting time (2.5% solution, 16° C.) sec | 400 | 200 | 120 | 90 | 150 |
| Gel strength dyn. cm$^{-2}$ (2.5% solution, 16° C.) | $5 \times 10^4$ | $7.5 \times 10^4$ | $6 \times 10^4$ | $5.5 \times 10^4$ | $6.5 \times 10^4$ |
| Viscosity cP (6.67% solution, 40° C.) | 6 | 5 | 5 | 18 | 6 |

As in the gelatins according to the invention listed in Table 3, the connection between setting time and peptide content on the one hand and between viscosity and microgel content on the other hand can be recognized. Since, however, the commercially available gelatins 11 through 15 all have higher peptide contents, the short setting times attained with the gelatins according to the invention, Nos. 6 through 10, are not attained with the commercially available gelatins.

EXAMPLE 5

Using a gelatin produced according to Example 1 (gelatin Sample No. 4 in Table 2) a silver halide emulsion containing a chromogeneous coupler is produced in the following manner and processed into a photographic coating:

150 g of a red sensitized silver halide emulsion containing 24.37 g silver bromide and 7 g gelatin are mixed with 300 g of a finely dispersed emulsion containing 20 g of a two-equivalent cyan coupler of the formula

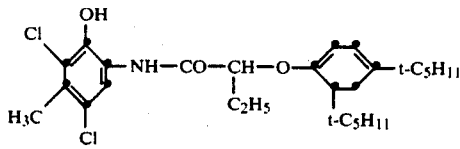

10 g tricresyl phosphate, 2.5 g of an anionic active dispersant and 15 g gelatin. 550 g of a 7% aqueous gelatin solution are added to the mixture.

1000 g of a pourable solution containing 1.4% silver, 2% coupler and 6.05% gelatin are produced. The viscosity of the solution at 40° C. is 16 cP and the setting time, measured at 16° C., is 20 seconds. This is precisely the same setting time measured for a 6.05% solution of the same gelatin No. 4, without any further additives.

The ready-to-pour solution is applied onto a glass substrate to a layer thickness corresponding to a weight per area of 20 g per m$^2$. The solution is set by a short cooling, then dried by blowing on warm air.

A photosensitive layer is obtained which, after exposure under a transparent sample and after customary processing by color development, silver bleaching and fixing, furnishes a negative blue-green image of the sample.

It will be understood that the above description of the present invention is susceptible to various modifications, changes and adaptations, and the same are intended to be comprehended within the meaning and range of equivalents of the appended claims.

What is claimed is:

1. A gelatin comprising microgel, alpha-gelatin, oligomers of alpha-gelatin, and from 1 to less than 25% by weight of said gelatin, of fragments of alpha-gelatin having a molecular weight of no more than $9 \times 10^4$, said gelatin having a setting time of less than one minute measured at 16° C. and with 2.5 g gelatin in 1 dl water.

2. Gelatin as defined in claim 1 wherein the content of said fragments is less than 20% by weight.

3. Gelatin as defined in claim 2 wherein the content of said fragments is less than 10% by weight.

4. Gelatin as defined in claim 1, 2, or 3, wherein the content of said microgel is 5% to 15% by weight, the content of said alpha-gelatin is 20% to 60% by weight, and the content of said oligomers of alpha-gelatin having 2 to 15 linked alpha-gelatin chains is 30% to 70% by weight.

5. Gelatin as defined in claim 1, 2, or 3 comprising less than 5% by weight amino acid radicals in D-configuration.

6. Gelatin as defined in claim 1, 2, or 3, wherein a 10% by weight aqueous solution of said gelatin at 60° C., has a viscosity greater than 180 mP.

7. Gelatin as defined in claim 6 wherein said viscosity is 200 to 350 mP.

8. A pharmaceutical preparation comprising a gelatin as defined in claim 1, 2, or 3.

9. A foodstuff comprising a gelatin as defined in claim 1, 2, or 3.

10. A photographic material coating comprising a gelatin as defined in claim 1, 2, or 3.

11. Method for producing a gelatin as defined in claim 1, 2, or 3 comprising conventionally pretreating raw material for gelatin and then melting gelatin out of the pretreated raw material by brewing at a pH of 6.5 to 7.0, and a temperature of 80° C. to 100° C., for a brewing time of 5 to 40 minutes, to produce a solution of the gelatin.

12. Method as defined in claim 11 wherein said temperature is 80° to 90° C.

13. Method as defined in claim 12 wherein said brewing time is 20 to 40 minutes.

14. Method as defined in claim 11 additionally comprising cooling the gelatin solution within 1 to 60 minutes to a temperature below 55° C.

15. Method as defined in claim 14 wherein said cooling takes place within 1 to 5 minutes.

16. Method as defined in claim 14 wherein said cooling is to a temperature below 45° C.

17. Method as defined in claim 11 additionally comprising converting the gelatin from the sol to the gel phase within 5 to 45 minutes.

18. Method as defined in claim 17 where said conversion takes place within 5 to 15 minutes.

19. Method as defined in claim 11 wherein the raw material is pretreated by the alkali method.

20. Method as defined in claim 11 wherein the raw material is pretreated by the acid method.

21. Method for producing a gelatin as defined in claim 1, 2, or 3, comprising fractionating conventional gelatin.

22. Method as defined in claim 21 wherein the composition of the gelatin is monitored by gel chromatography.

23. Method as defined in claim 11 wherein said temperature is 82° to 90° C.

* * * * *